United States Patent
Hirakata (10) Patent No.: US 9,488,882 B2
(45) Date of Patent: Nov. 8, 2016

(54) LIQUID CRYSTAL SHUTTER GLASSES

(75) Inventor: Yoshiharu Hirakata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 181 days.

(21) Appl. No.: 13/301,848

(22) Filed: Nov. 22, 2011

(65) Prior Publication Data

US 2012/0127382 A1    May 24, 2012

(30) Foreign Application Priority Data

Nov. 24, 2010 (JP) ................. 2010-261810

(51) Int. Cl.
G02F 1/1343 (2006.01)
H04N 13/04 (2006.01)
G02F 1/1345 (2006.01)
G02B 27/22 (2006.01)
G02F 1/1337 (2006.01)

(52) U.S. Cl.
CPC .... G02F 1/134363 (2013.01); H04N 13/0438 (2013.01); G02B 27/2264 (2013.01); G02F 1/1345 (2013.01); G02F 1/133707 (2013.01); G02F 2001/134318 (2013.01); H04N 2213/008 (2013.01)

(58) Field of Classification Search
CPC combination set(s) only.
See application file for complete search history.

(56) References Cited

U.S. PATENT DOCUMENTS

| | | | |
|---|---|---|---|
| 6,111,627 A * | 8/2000 | Kim .................. | G02F 1/134363 349/141 |
| 6,888,608 B2 * | 5/2005 | Miyazaki et al. ............ | 349/156 |
| 7,342,632 B2 | 3/2008 | Miyachi et al. | |
| 2003/0052838 A1 * | 3/2003 | Kim et al. ....................... | 345/32 |
| 2004/0183986 A1 * | 9/2004 | Onda et al. ................... | 349/153 |
| 2004/0263749 A1 * | 12/2004 | Jeong et al. .................. | 349/141 |
| 2008/0129901 A1 * | 6/2008 | You et al. ....................... | 349/33 |
| 2009/0322997 A1 * | 12/2009 | Kaihoko et al. ............. | 349/117 |
| 2010/0231842 A1 | 9/2010 | Ishitani et al. | |
| 2011/0141421 A1 * | 6/2011 | Lee et al. ...................... | 349/138 |
| 2011/0249229 A1 | 10/2011 | Kubota et al. | |

FOREIGN PATENT DOCUMENTS

| | | |
|---|---|---|
| JP | 2001-305554 A | 10/2001 |
| JP | 2004-093844 A | 3/2004 |
| JP | 2005-227760 | 8/2005 |
| JP | 2007-271839 | 10/2007 |

* cited by examiner

Primary Examiner — Wen-Ying P Chen
(74) Attorney, Agent, or Firm — Nixon Peabody LLP; Jeffrey L. Costellia (57) ABSTRACT

Provided is liquid crystal shutter glasses in which light leakage at the time when a liquid crystal shutter is closed is suppressed. The liquid crystal shutter glasses includes a first substrate and a second substrate with a liquid crystal layer containing a liquid crystal material exhibiting a blue phase provided therebetween, a first electrode with a comb shape and a first common electrode with a comb shape which are provided between the first substrate and the liquid crystal layer, and a second electrode with a comb shape and a second common electrode with a comb shape which are provided between the second substrate and the liquid crystal layer. The first electrode overlaps with the second electrode. The first common electrode overlaps with the second common electrode. The first electrode is connected to the second electrode.

6 Claims, 7 Drawing Sheets

LIQUID CRYSTAL SHUTTER GLASSES

BACKGROUND OF THE INVENTION

1. Field of the Invention

The present invention relates to liquid crystal shutter glasses.

2. Description of the Related Art

In recent years, a liquid crystal display device which can display pseudo three-dimensional images has been developed. For example, a liquid crystal display device by which two-dimensional images are perceived as three-dimensional images, utilizing parallax between the left and right human eyes. In such a liquid crystal display device, for example, an image for the left eye and an image for the right eye are alternately displayed in a pixel portion. Viewers see the images through the glasses with liquid crystal shutters (hereinafter, referred to as liquid crystal shutter glasses), so that the viewers perceive two-dimensional images as three-dimensional images. At this time, when an image for the left eye is displayed in the liquid crystal display device, the liquid crystal shutter for the right eye is closed to block light incident on the right eye of the viewer, and when an image for the right eye is displayed in the liquid crystal display device, the liquid crystal shutter for the left eye is closed to block light incident on the left eye of the viewer.

In such a method using the liquid crystal shutter glasses, an image for the left eye and an image for the right eye are displayed alternately in the liquid crystal display device; therefore, the number of frames recognized by the eyes (corresponding to the amount of image data) is reduced to half of the number of frames displayed by the liquid crystal display device. When the number of frames is small, viewers perceive flickers in images. Thus, measures are taken against flickers of display to increase driving frequency of a liquid crystal display device and the number of frames perceived by each eye.

In order to respond to the increase of driving frequency of the liquid crystal display device, liquid crystal shutters need to be opened and closed at high speed in the liquid crystal shutter glasses. In order to open and close the liquid crystal shutters at high speed, liquid crystal molecules need to respond at high speed.

A liquid crystal mode using a liquid crystal exhibiting a blue phase (a blue-phase liquid crystal) has attracted attention as a liquid crystal mode capable of responding at high speed.

Patent Document 1 discloses a method for driving a liquid crystal exhibiting a blue phase in which a pair of electrodes is provided over one substrate, a horizontal electric field for forming lines of electric force almost parallel to the substrate surface is generated between the pair of electrodes, and liquid crystal molecules are driven using the generated horizontal electric field.

Patent Document 1 discloses a technique for lowering driving voltage in which an electrode is provided over an insulating layer formed in a projecting shape and the maximum electric field region is formed apart from the substrate, so that a horizontal electric field is formed widely.

REFERENCE

Patent Document

[Patent Document 1] Japanese Patent Published Application No. 2005-227760

SUMMARY OF THE INVENTION

As Patent Document 1, projecting structure bodies formed using an insulating material are regularly provided so as to obtain a horizontal electric field widely; however, the phase of transparent light is shifted, whereby the polarization state of the transparent light might be influenced.

Further, when projecting structure bodies formed using a metal, or thick electrodes are regularly formed, the structure bodies or the electrodes serve like a linear polarizing plate, whereby the polarization state of the transparent light might be influenced.

When the polarization state of the transparent light is changed due to the influence of the structure bodies or the like as described above, light leakage is caused when a liquid crystal shutter is closed. As a result, data on an image for the left eye and data on an image for the right eye are mixed in a user's brain (hereinafter, such a phenomenon is referred to as crosstalk) in some cases. Due to the crosstalk, the user cannot accurately recognize two-dimensional images as three-dimensional images in some cases.

In view of the above, an object of one embodiment of the present invention is to provide liquid crystal shutter glasses in which light leakage at the time when a liquid crystal shutter is closed is suppressed.

Liquid crystal shutter glasses have a liquid crystal layer sandwiched between a first substrate and a second substrate. Here, the prevent inventor focuses on the structure in which a pair of electrodes is provided over the first substrate, a pair of electrodes is provided over the second substrate, and liquid crystals exhibiting a blue phase are sandwiched between the first substrate and the second substrate.

With the use of blue-phase liquid crystals, the response speed of liquid crystal molecules can be lower than or equal to 1 ms. Thus, liquid crystal shutter glasses in which shutters can be opened and closed at high speed can be provided.

A pair of electrodes is provided over each of the first substrate and the second substrate, so that the horizontal electric field can be generated uniformly and widely in the liquid crystal layer. The horizontal electric field is generated widely, whereby liquid crystals exhibiting a blue phase can be driven at low voltage.

In the liquid crystal shutter glasses capable of being driven at low voltage, light can be transmitted enough when the shutter is opened; thus, the ratio of the light transmittance at the time when the shutter is opened to the light transmittance at the time when the shutter is closed can be high.

In addition, there is no need to provide structure bodies below electrodes regularly or to increase the thickness of the electrodes in order to generate the horizontal electric field widely; thus, a change in polarization state of the transparent light due to the influence of the structure bodies or the electrodes can be suppressed. Accordingly, light leakage at the time when the liquid crystal shutter is closed can be suppressed.

A first electrode and a second electrode are connected to each other in one embodiment of the present invention. Consequently, the same potential can be applied to the first electrode and the second electrode using one voltage application unit. Thus, the number of manufacturing steps and the manufacturing cost of the liquid crystal shutter glasses can be reduced.

Specifically, one embodiment of the present invention is liquid crystal shutter glasses including a first substrate and a second substrate with a liquid crystal layer containing a liquid crystal material exhibiting a blue phase provided therebetween, a first electrode with a comb shape and a first common electrode with a comb shape which are provided between the first substrate and the liquid crystal layer, and a second electrode with a comb shape and a second common electrode with a comb shape which are provided between the second substrate and the liquid crystal layer. The first electrode overlaps with the second electrode. The first common electrode overlaps with the second common electrode. The first electrode is connected to the second electrode.

In the liquid crystal shutter glasses, a first projecting structure body is formed over the first substrate, and the first electrode and the second electrode are preferably in contact with each other over the first structure body.

In the liquid crystal shutter glasses, a second projecting structure body is formed over the second substrate, and the first electrode and the second electrode are preferably in contact with each other over the second structure body.

The resistance of the electrodes can be reduced as the number of connection portions between the first electrode and the second electrode is increased.

In one embodiment of the present invention, one or more projecting structure bodies can be provided over each substrate. The portion where the first electrode and the second electrode are connected to each other over the structure body has a function of keeping the cell gap because the structure body and the electrodes serve as a spacer of the liquid crystal shutter.

In the liquid crystal shutter glasses, the first common electrode is preferably connected to the second common electrode.

With this structure, the same potential can be applied to the first common electrode and the second common electrode, using one voltage application unit as in the first electrode and the second electrode.

In the liquid crystal shutter glasses, a third projecting structure body is formed over the first substrate, and the first common electrode and the second common electrode are preferably in contact with each other over the third structure body.

In the liquid crystal shutter glasses, a fourth projecting structure body is formed over the second substrate, and the first common electrode and the second common electrode are preferably in contact with each other over the fourth structure body.

The resistance of the common electrodes can be reduced as the number of connection portions between the first common electrode and the second common electrode is increased. Further, the portion where the first common electrode and the second common electrode are connected to each other on the structure body has a function of keeping the cell gap because the structure body and the common electrodes serve as a spacer of the liquid crystal shutter.

It is preferable that the first electrode, the second electrode, the first common electrode, and the second common electrode each have a thickness less than 1.5 μm, preferably, less than or equal to 1.0 μm, in the above structure.

The thicknesses of the electrode and the common electrode are reduced, whereby the influence of the electrode and the common electrode on the polarization state of the transparent light can be suppressed. Accordingly, light leakage at the time when the liquid crystal shutter is closed can be suppressed.

In the above structure, it is preferable that the first electrode, the second electrode, the first common electrode, and the second common electrode be each formed using a metal film because the resistance of the electrodes and common electrodes is lowered. In the above structure, it is preferable that the first electrode, the second electrode, the first common electrode, and the second common electrode be each formed using a conductive film that transmits visible light because the aperture ratio and light transmittance of the liquid crystal shutter are not lowered. Further, the first electrode, the second electrode, the first common electrode, and the second common electrode may be formed using a metal film and a conductive film that transmits visible light.

With one embodiment of the present invention, liquid crystal shutter glasses in which light leakage at the time when a liquid crystal shutter is closed is suppressed can be provided.

DETAILED DESCRIPTION OF THE INVENTION

Embodiments will be described in detail with reference to the drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in the structures of the invention described below, the same portions or portions having similar functions are denoted by the same reference numerals in different drawings, and description of such portions is not repeated.

Embodiment 1

In Embodiment 1, the structure of liquid crystal shutter glasses of one embodiment of the present invention will be described with reference to FIGS. 1A to 1C, FIGS. 2A to 2C, and FIGS. 5A and 5B.

Figure 1A:
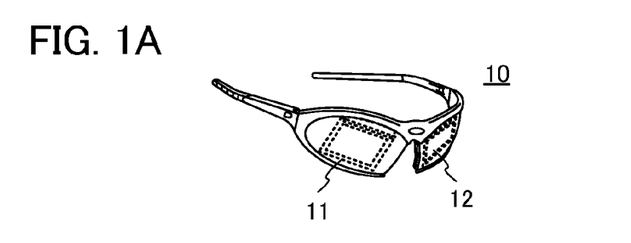
FIGS. 1A to 1C are diagrams showing liquid crystal shutter glasses of one embodiment of the present invention.

Liquid crystal shutter glasses 10 of this embodiment in FIG. 1A includes a liquid crystal shutter 11 for the right eye and a liquid crystal shutter 12 for the left eye in regions corresponding to eyeglass lenses. Each of the liquid crystal shutter 11 for the right eye and the liquid crystal shutter 12 for the left eye is electrically connected to a driving unit (not shown).

A voltage higher than or equal to a threshold voltage is applied using the driving unit at regular time intervals, whereby the liquid crystal shutter 11 for the right eye and the liquid crystal shutter 12 for the left eye are alternately set to be in an "open state" in which light transmittance is high and a "closed state" in which light transmittance is low.

The driving unit is synchronized with an image display device displaying an image for the left eye and an image for the right eye alternately and can control the liquid crystal shutter glasses 10 in the following a manner: when the image display device displays an image for the left eye, the liquid crystal shutter 12 for the left eye is set to be in the "open state" and the liquid crystal shutter 11 for the right eye is set to be in the "closed state", and when the image display device displays an image for the right eye, the liquid crystal shutter 12 for the left eye is set to be in the "closed state" and the liquid crystal shutter 11 for the right eye is set to be in the "open state".

With the above operation, only the image for the left eye enters the left eye of a user watching the image display device through the liquid crystal shutter glasses 10, and only the image for the right eye enters the right eye of the user. The image for the left eye and the image for the right eye are synthesized in the user's brain so that the image displayed on the image display device is recognized as a three-dimensional image.

Next, structural examples of the liquid crystal shutter 11 for the right eye and the liquid crystal shutter 12 for the left eye will be described. The liquid crystal shutter 11 for the right eye and the liquid crystal shutter 12 for the left eye can have the same structure; thus, the structure of the liquid crystal shutter 11 for the right eye will be described with reference to FIG. 1B.

Figure 1B:
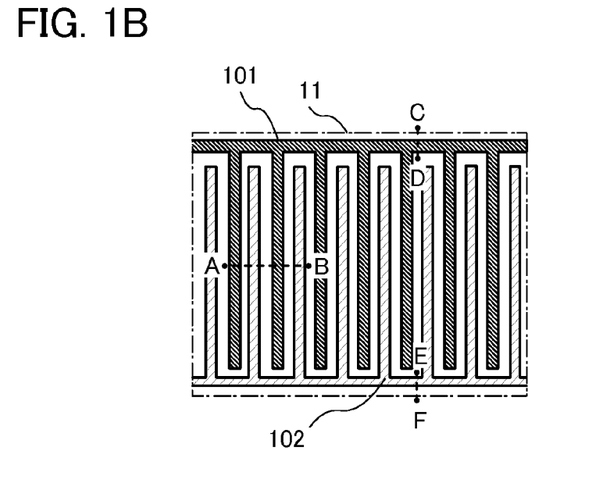

The liquid crystal shutter 11 for the right eye in FIG. 1B includes an electrode 101 with a comb shape and a common electrode 102 with a comb shape. The electrode 101 and the common electrode 102 is each electrically connected to a driving unit (not shown).

As the driving units, a driving unit for controlling the liquid crystal shutter 11 for the right eye and a driving unit for controlling the liquid crystal shutter 12 for the left eye may be provided. Alternatively, one driving unit may control the driving of the both shutters.

In one embodiment of the present invention, the electrode 101 and the common electrode 102 are provided so as not to be in contact with each other.

In one embodiment of the present invention, the electrode and the common electrode do not have flat plate-like shapes but have various opening patterns (slits) including a bent portion or a branched comb shape. For example, the electrode and the common electrode can each have a comb pattern which does not form a closed space and is opened. In this case, the electrode and the common electrode can be provided on one insulating surface (e.g., one substrate or one insulating film) such that their comb patterns are engaged with each other. The shape shown in FIG. 2C may also be given as an example of the shape of the electrode and the common electrode.

Figure 1C:
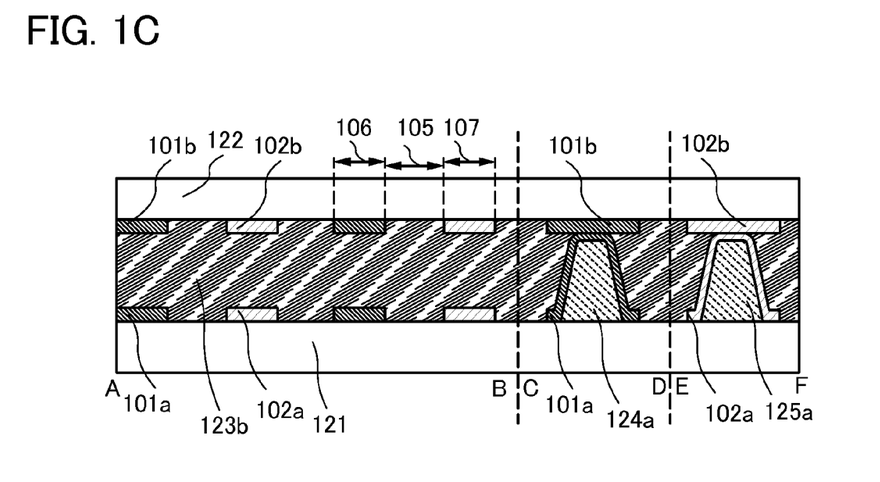

A cross-sectional view taken along the lines A-B, C-D, and E-F in FIG. 1B will be shown in FIG. 1C.

The liquid crystal shutter shown in FIG. 1C includes a first electrode 101a and a first common electrode 102a over a first substrate 121. The liquid crystal shutter further includes a second electrode 101b and a second common electrode 102b over a second substrate 122. In addition, a liquid crystal layer 123b exhibiting a blue phase is sandwiched between the first substrate 121 and the second substrate 122. Note that the liquid crystal shutter may have an insulating film between the first substrate 121 and the first electrode 101a and between the first substrate 121 and the first common electrode 102a.

As shown in FIG. 1C, the first electrode 101a overlaps with the second electrode 101b, and the first common electrode 102a overlaps with the second common electrode 102b.

Figure 5A:
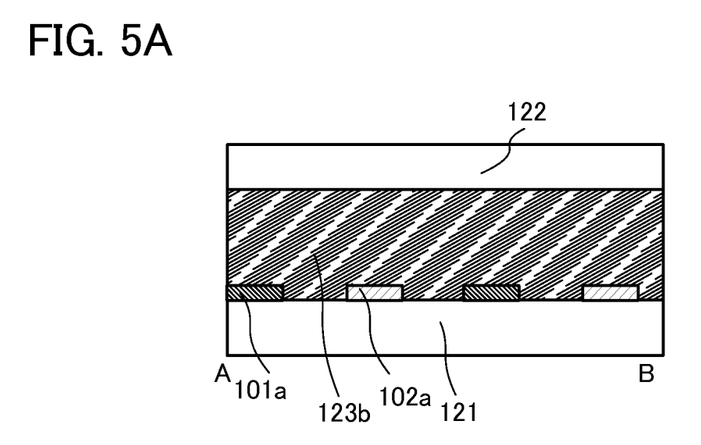
FIGS. 5A and 5B are diagrams showing a liquid crystal shutter in Embodiment 1.
Figure 5B:
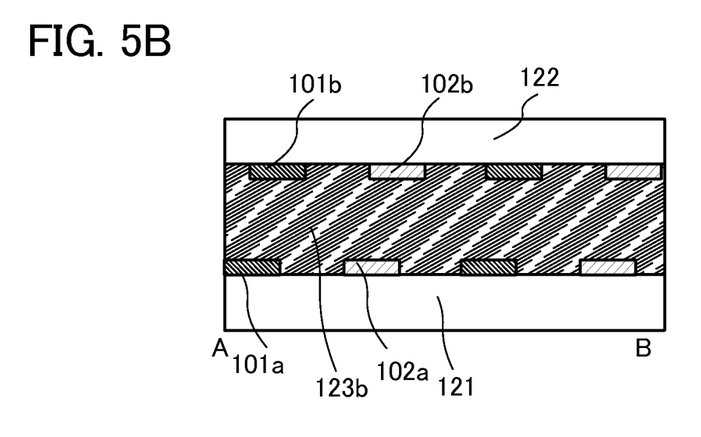

As shown in FIG. 5B, part of the first electrode 101a may overlap with part of the second electrode 101b and part of the first common electrode 102a may overlap with part of the second common electrode 102b. It is preferable that almost all parts of the first electrode 101a overlap with the second electrode 101b and almost all parts of the first common electrode 102a overlap with the second common electrode 102b as shown in FIG. 1C because a horizontal electric field can be generated widely in the liquid crystal layer.

In this embodiment, the first electrode 101a and the second electrode 101b have substantially the same shape and the first common electrode 102a and the second common electrode 102b have substantially the same shape from a plane view. The first electrode 101a and the second electrode 101b overlap each other with the liquid crystal layer 123b provided therebetween, and the first common electrode 102a and the second common electrode 102b overlap each other with the liquid crystal layer 123b provided therebetween. With this structure, a horizontal electric field can be generated widely in the liquid crystal layer.

A horizontal electric field is generated between the first electrode 101a and the first common electrode 102a in a portion take along line A-B in FIG. 1C. In addition, the horizontal electric field is also generated between the second electrode 101b and the second common electrode 102b.

The intensity of the horizontal electric field becomes low as the distance between the horizontal electric field and the electrode is increased in the height direction (the film thickness direction). For example, as shown in FIG. 5A, the intensity of the horizontal electric field generated between the first electrode 101a and the first common electrode 102a in a region away from the electrodes in the height direction, in other words, a region close to the second substrate 122 is lower than that in a region close to the first substrate 121. However, in one embodiment of the present invention, the first substrate 121 and the second substrate 122 each have a pair of electrodes (an electrode and a common electrode) as shown in FIG. 1C. Consequently, the horizontal electric field is generated in each of the region close to the first substrate 121 and the region close to the second substrate 122, whereby the intensity of the electric field in the height direction can be increased.

Since the intensity of the horizontal electric field in the height direction can be increased, the intensity of the horizontal electric field can be increased. The intensity of the horizontal electric field is increased, whereby the voltage for driving the liquid crystal shutter glasses can be lowered.

The distance between the electrode and the common electrode, which are adjacent to each other with the liquid crystal layer interposed therebetween, is a distance at which liquid crystals in the liquid crystal layer provided between the electrode and the common electrode respond to a predetermined voltage which is applied to the electrode and the common electrode. A distance 105 between the electrode and the common electrode which are adjacent to each other with the liquid crystal layer interposed therebetween is longer than or equal to 0.5 µm and shorter than or equal to 20 µm, preferably longer than or equal to 1 µm and shorter than or equal to 5 µm. The voltage applied thereto is controlled as appropriate depending on the distance. A width 106 of the electrode and a width 107 of the common electrode are each preferably the same as the distance 105 between the electrode and the common electrode.

In the height direction (the film thickness direction), each of the thicknesses of the electrode and the common electrode is preferably less than 1.5 μm, further preferably less than or equal to 1.0 μm.

The thicknesses of the electrode and the common electrode are reduced, whereby the influence of the electrode and the common electrode on the polarization state of the transparent light can be suppressed. Accordingly, light leakage at the time when the liquid crystal shutter is closed can be suppressed.

A projecting structure body 124a is provided over the first substrate 121 in a portion take along line C-D in FIG. 1C. A projecting structure body 125a is provided over the first substrate 121 in a portion take along line E-F in FIG. 1C.

The first electrode 101a covering the projecting structure body 124a is in contact with the second electrode 101b. The first common electrode 102a covering the projecting structure body 125a is in contact with the second common electrode 102b.

The first electrode 101a and the second electrode 101b are connected to each other, whereby the same potential can be applied to the first electrode 101a and the second electrode 101b using one voltage application unit. Similarly, the first common electrode 102a and the second common electrode 102b are connected to each other, whereby the same potential can be applied to the first common electrode 102a and the second common electrode 102b using one voltage application unit. Thus, the number of manufacturing steps and the manufacturing cost of the liquid crystal shutter glasses can be reduced.

Figure 2A:
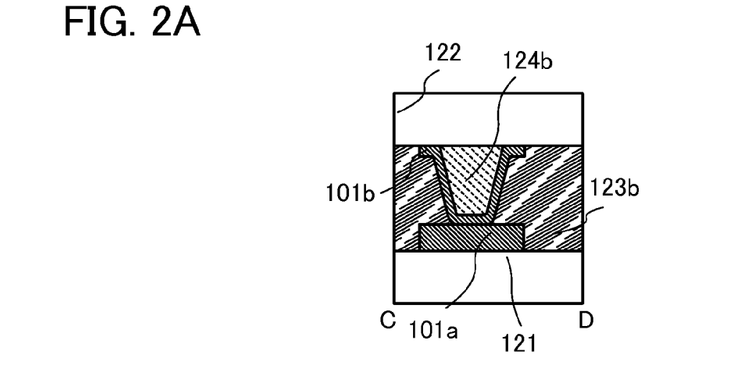
FIGS. 2A to 2C are diagrams showing a liquid crystal shutter of one embodiment of the present invention.
Figure 2B:
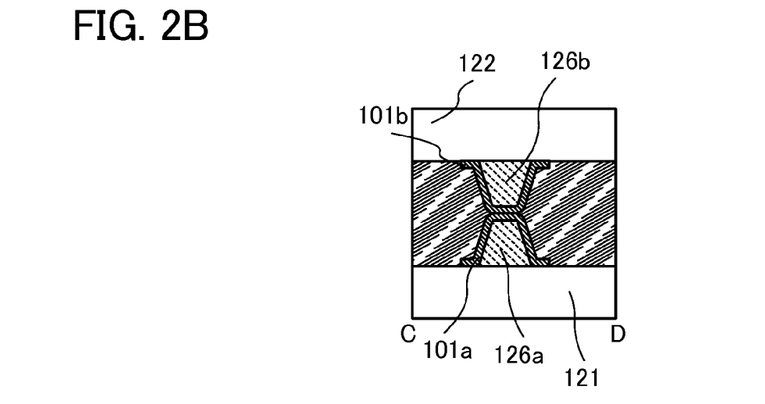
Figure 2C:
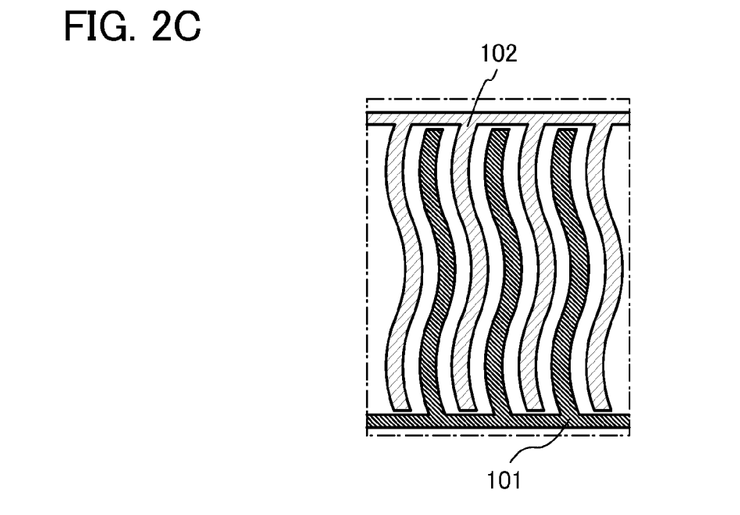

One embodiment of the present invention is not limited to the structure in which the structure body is provided only over the first substrate 121. For example, a projecting structure body 124b may be provided over the second substrate 122 and the second electrode 101b covering a structure body 124b may be in contact with the first electrode 101a as shown in FIG. 2A. Alternatively, the first electrode 101a covering a projecting structure body 126a and the second electrode 101b covering a structure body 126b may be in contact with each other as shown in FIG. 2B.

The number of connection portions between the first electrode 101a and the second electrode 101b may be at least one in one liquid crystal shutter.

The number of connection portions between the first common electrode 102a and the second common electrode 102b may be zero; however, at least one connection portion is preferably formed in one liquid crystal shutter.

As the voltage application unit provided in the liquid crystal shutter glasses, a switching element including a transistor or the like can be used. Note that a switching element may be provided in each of the liquid crystal shutters.

A liquid crystal material exhibiting a blue phase is used for the liquid crystal layer 123b.

Note that a liquid crystal material refers to a mixture which includes liquid crystal and is used for a liquid crystal layer.

Figure 7A:
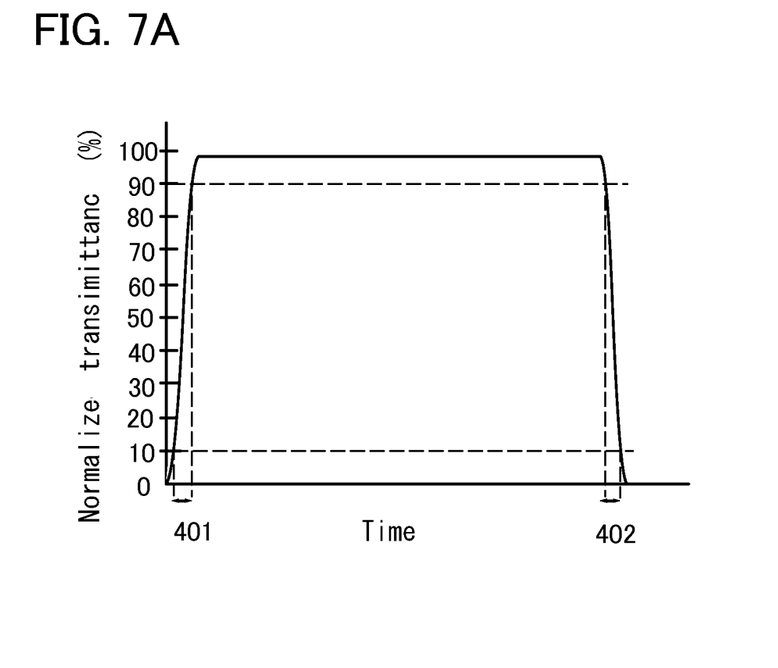
FIGS. 7A and 7B are graphs showing the response speed of liquid crystals.
Figure 7B:
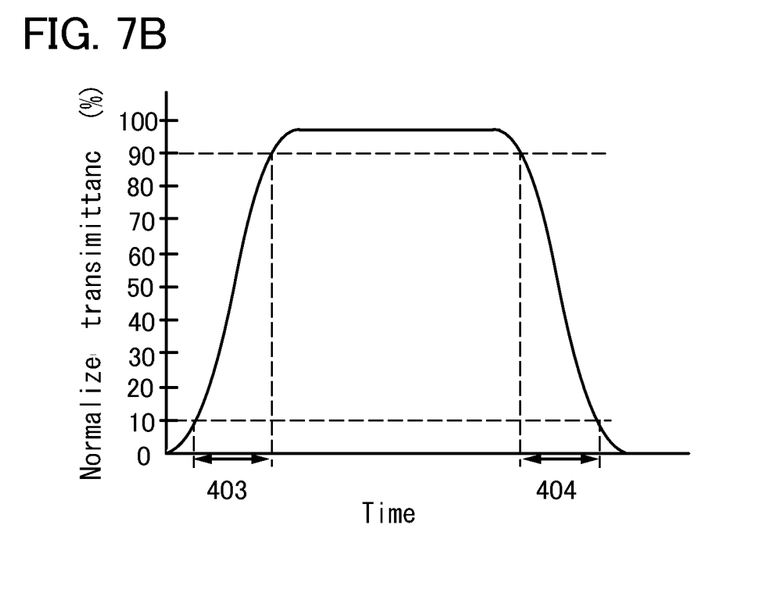

The response speed of the liquid crystals will be described with reference to FIGS. 7A and 7B. FIGS. 7A and 7B are diagrams each showing a relation between normalized transmittance where the maximum transmittance is 100% and time. FIG. 7A shows a case of using a liquid crystal exhibiting a blue phase and FIG. 7B shows a case of using a vertical alignment (VA) mode liquid crystal. With the use of the liquid crystal exhibiting a blue phase utilized, a rise time 401 (time taken for the normalized transmittance to rise from 10% to 90%) and a fall time 402 (time taken for the normalized transmittance to fall from 90% to 10%) can be shorter than a rise time 403 and a fall time 404 of a vertical alignment (VA) mode liquid crystal which is a conventional example. Specifically, the rise time of the liquid crystal exhibiting a blue phase can be shorter than or equal to 200 μs as shown in FIG. 7A. On the other hand, a rise time of the vertical alignment (VA) mode liquid crystal is longer than the liquid crystal exhibiting a blue phase and is 1 ms to 2 ms.

As described above, the response speed of a liquid crystal material exhibiting a blue phase is shorter than that of the conventional liquid crystal material and is capable of responding at high speed, leading to higher performance of liquid crystal shutter glasses.

Note that the first substrate 121 and the second substrate 122 are each provided with an optical film such as a polarizing plate and an anti-reflective film (not shown) as appropriate. Depending on the situation, circular polarization may be employed using a polarizing plate and a retardation plate.

As described above, in the liquid crystal shutter glassed of this embodiment, the response speed of liquid crystal molecules can be lower than or equal to 1 ms with the use of liquid crystals exhibiting a blue phase. Thus, liquid crystal shutter glasses in which shutters can be opened and closed at high speed can be provided.

In addition, a pair of electrodes is provided over each of the first substrate and the second substrate, so that the horizontal electric field can be generated uniformly and widely in the liquid crystal layer. The horizontal electric field is generated widely, whereby liquid crystals exhibiting a blue phase can be driven at low voltage.

A pair of electrodes is provided on each of the first substrate and the second substrate, so that the horizontal electric field can be generated uniformly and widely in the liquid crystal layer even when each of the thicknesses of the electrodes is small. Thus, the influence of the electrode and the common electrode on the polarization state of the transparent light can be suppressed. Accordingly, light leakage at the time when the liquid crystal shutter is closed can be suppressed. Consequently, generation of crosstalk in an image for the right eye and an image for the left eye at the time when the liquid crystal shutter glasses are used can be suppressed.

In one embodiment of the present invention, a liquid crystal exhibiting a blue phase is used. The liquid crystal exhibiting a blue phase does not need a rubbing treatment and has a wide margin in the thickness direction of a cell gap; thus, even in the case where liquid crystal shutter glasses have a curved shape like general glasses, the liquid crystal exhibiting a blue phase can be used.

In one embodiment of the present invention, the first electrode and the second electrode are connected to each other. Accordingly, the same potential can be applied to the first electrode and the second electrode using one voltage application unit. Thus, the number of manufacturing steps and the manufacturing cost of the liquid crystal shutter glasses can be reduced.

Embodiment 2

In this embodiment, a method for manufacturing a liquid crystal shutter which can be applied to one embodiment of the present invention will be described with reference to FIGS. 3A to 3C.

In this embodiment, a method for manufacturing a liquid crystal shutter with the structure shown in FIG. 1C will be described.

As the first substrate 121 and the second substrate 122, a substrate that transmits visible light, such as a glass substrate made of barium borosilicate glass, aluminoborosilicate glass, or the like, a quartz substrate, or a plastic substrate, can be used.

Figure 3A:
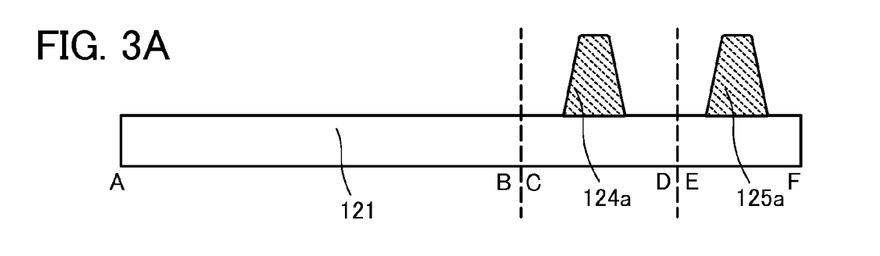
FIGS. 3A to 3C are diagrams showing a method for manufacturing the liquid crystal shutter of one embodiment of the present invention.

First, the projecting structure bodies 124a and 125a are formed over the first substrate 121 (see FIG. 3A). Note that the liquid crystal shutter may have an insulating film between the first substrate 121 and the projecting structure bodies 124a and 125a.

The projecting structure bodies 124a and 125a can be formed using an insulating material (an organic material and an inorganic material) and a conductive material (an organic material and an inorganic material). It is preferable to use a visible-light curing resin, an ultraviolet curing resin, or a thermosetting resin, which are organic insulating materials. For example, an acrylic resin, an epoxy resin, an amine resin, or the like can be used. Alternatively, the structure bodies may be formed using a conductive resin or a metal material. Note that the projecting structure bodies 124a and 125a may have a structure in which thin films formed of a plurality of insulating materials or a plurality of conductive materials are stacked.

The projecting structure bodies 124a and 125a may have a columnar shape or a conical or pyramidal shape with a flat top surface and a trapezoidal cross section, a conical or pyramidal shape with a rounded top surface, or the like. The projecting structure bodies 124a and 125a preferably have a rib shape with a curved surface with little unevenness so as to be favorably covered with the electrode and the common electrode. In addition, in order not to lower the aperture ratio and the transmittance of the liquid crystal shutter, the projecting structure bodies 124a and 125a are preferably formed using a material that transmits visible light.

Further, materials and shapes of the structure bodies may be different between the projecting structure bodies 124a and 125a.

There is no particular limitation on the method for forming the structure bodies 124a and 125a, and a dry method such as an evaporation method, a sputtering method, or a CVD (Chemical Vapor Deposition) method or a wet method such as spin coating, dip coating, spray coating, a droplet discharging method (ink jetting), nanoimprinting, or various printing methods (screen printing or offset printing) may be used depending on the material. As needed, an etching method (dry etching or wet etching) may be employed to form a desired pattern.

Figure 3B:
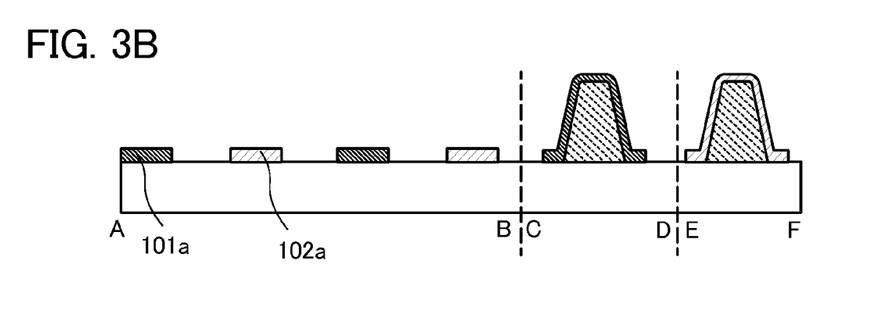

Next, the first electrode 101a and the first common electrode 102a are formed (see FIG. 3B).

The first electrode 101a and the first common electrode 102a can be formed in the following manner: a conductive film is formed over the first substrate 121 and is selectively etched. In this embodiment, the first electrode 101a is selectively formed over the first substrate 121 and is also formed so as to overlap with the top surface and the side surfaces of the structure body 124a. Further, the first common electrode 102a is selectively formed over the first substrate 121 and is also formed so as to overlap with the top surface and the side surfaces of the structure body 125a. The first electrode 101a and the first common electrode 102a are preferably provided at regular intervals in a portion take along line A-B in FIG. 3B.

It is preferable that the first electrode 101a and the first common electrode 102a each have a thickness of less than 1.5 μm, particularly, less than or equal to 1.0 μm.

The thicknesses of the first electrode 101a and the first common electrode 102a are reduced, whereby the influence of the first electrode 101a and the first common electrode 102a on the polarization state of the transparent light can be suppressed. Accordingly, light leakage at the time when the liquid crystal shutter is closed can be suppressed.

For the first electrode 101a and the first common electrode 102a, a metal material such as aluminum, gold, platinum, silver, nickel, tungsten, chromium, molybdenum, iron, cobalt, copper, palladium, or titanium can be used. Further, a nitride of the metal material (such as titanium nitride) or the like may be used.

The first electrode 101a and the first common electrode 102a preferably transmit visible light. A conductive film that transmits visible light can be formed using a mixed oxide of indium oxide and tin oxide, a mixed oxide of indium oxide and zinc oxide, organic indium, organic tin, an indium oxide containing tungsten oxide, an indium zinc oxide containing tungsten oxide, an indium oxide containing titanium oxide, an indium tin oxide containing titanium oxide, graphene, or the like. In the case of using the metal material (or the nitride thereof), the first electrode 101a and the first common electrode 102a may be thinned so that they transmit light.

A conductive composition containing a conductive macromolecule (also referred to as a conductive polymer) can be used to form the electrodes. The electrode formed using the conductive composition preferably has a sheet resistance of less than or equal to 10000 Ω/square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

Figure 3C:
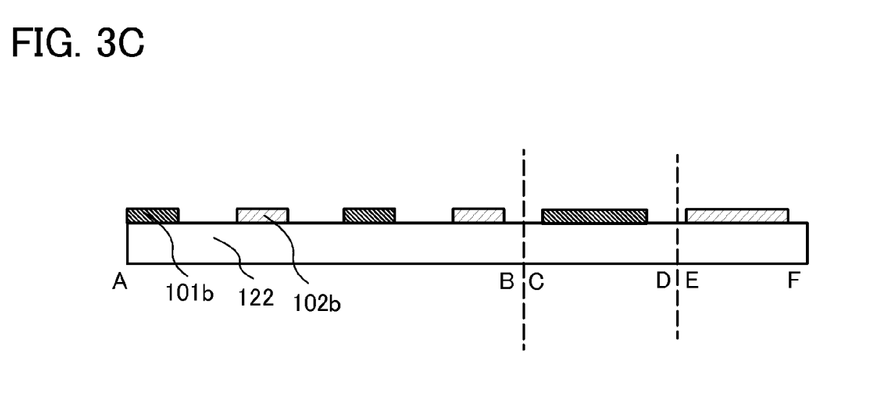

With a material and a method similar to those of the first electrode 101a and the first common electrode 102a, the second electrode 101b and the second common electrode 102b are formed over the second substrate 122 (see FIG. 3C). The second electrode 101b and the second common electrode 102b are preferably provided at regular intervals in a portion take along line A-B in FIG. 3C.

The second electrode 101b and the second common electrode 102b can be formed in the following manner: a conductive film is formed over the second substrate 122 and is selectively etched.

It is preferable that the second electrode 101b and the second common electrode 102b each have a thickness of less than 1.5 μm, particularly, less than or equal to 1.0 μm.

The thicknesses of the second electrode 101b and the second common electrode 102b are reduced, whereby the influence of the second electrode 101b and the second common electrode 102b on the polarization state of the transparent light can be suppressed. Accordingly, light leakage at the time when the liquid crystal shutter is closed can be suppressed.

Figure 4A:
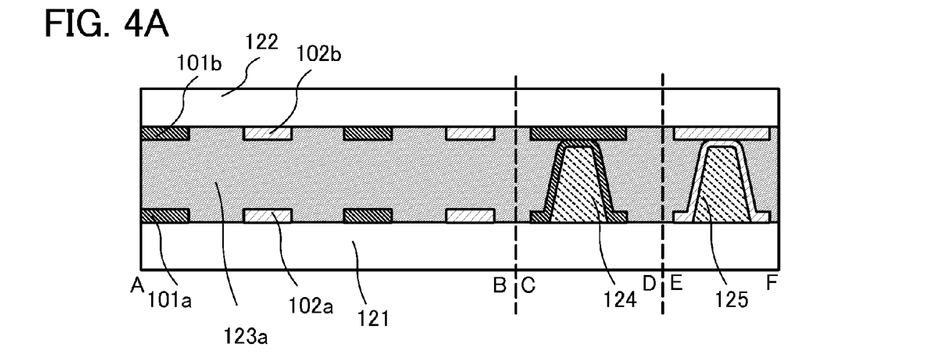
FIGS. 4A and 4B are diagrams showing a method for manufacturing the liquid crystal shutter of one embodiment of the present invention.

Then, the first substrate 121 and the second substrate 122 are attached to each other with a sealant with a liquid crystal layer 123a sandwiched therebetween, as shown in FIG. 4A. As a method for forming the liquid crystal layer 123a, a dropping method, or an injection method in which after attachment of the first substrate 121 and the second substrate 122, a liquid crystal is injected with the use of a capillary phenomenon can be used.

A liquid crystal material exhibiting a blue phase is used for the liquid crystal layer 123a. The liquid crystal layer 123a is formed using a liquid crystal material including a liquid crystal, a chiral agent, a photocurable resin, and a photopolymerization initiator.

The maximum thickness (film thickness) of the liquid crystal layer 123a is preferably greater than or equal to 1 μm and less than or equal to 20 μm.

The chiral agent is employed to align the liquid crystal in a helical structure and to make the liquid crystal exhibit a blue phase. For example, a liquid crystal material into which a chiral agent is mixed at 5 wt % or more may be used for the liquid crystal layer.

As the chiral agent, a material having a high compatibility with a liquid crystal and a strong twisting power is used. In addition, either an R-enantiomer or an S-enantiomer is favorable as the material, and a racemic body in which an R-enantiomer and an S-enantiomer are mixed at a ratio of 50:50 is not used.

As the liquid crystal, a thermotropic liquid crystal, a low-molecular liquid crystal, a high-molecular liquid crystal, a ferroelectric liquid crystal, an anti-ferroelectric liquid crystal, or the like is used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. A blue phase is transparent because it has the order of less than or equal to an optical wavelength, and optical modulation action is generated through a change in alignment order by voltage application. A blue phase is optically isotropic and thus has no viewing angle dependence; therefore, an alignment film is not necessarily formed. Consequently, a process related to formation of the alignment film is omitted, whereby a manufacturing cost can be reduced.

A blue phase is exhibited only in a narrow temperature range. Therefore, it is preferable that a photocurable resin and a photopolymerization initiator be added to a liquid crystal material and polymer stabilization treatment be performed in order to widen the temperature range where a blue phase is exhibited. The polymer stabilization treatment is performed in such a manner that a liquid crystal material containing a liquid crystal, a chiral agent, a photocurable resin, and a photopolymerization initiator is irradiated with light having a wavelength with which the photocurable resin and the photopolymerization initiator react. This polymer stabilization treatment may be performed by irradiating the liquid crystal material with light in the state of exhibiting an isotropic phase under the control of the temperature or by irradiating the liquid crystal material with light in the state of exhibiting a blue phase under the control of the temperature.

For example, the polymer stabilization treatment is performed in the following manner: the temperature of a liquid crystal layer is controlled and under the state in which the blue phase is exhibited, the liquid crystal layer is irradiated with light. However, the polymer stabilization treatment is not limited to this manner and may be performed in the following manner: a liquid crystal layer under the state of exhibiting an isotropic phase at temperatures within +10° C., preferably +5° C. of the phase transition temperature between the blue phase and the isotropic phase is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light at temperatures within +10° C., preferably +5° C. of the phase transition temperature between the blue phase and the isotropic phase (with an isotropic phase exhibited). In the case of using an ultraviolet curable resin (a UV curable resin) as the photocurable resin included in the liquid crystal material, the liquid crystal layer may be irradiated with ultraviolet rays. Even in the case where a blue phase is not exhibited, if polymer stabilization treatment is performed by irradiation with light at temperatures within +10° C., preferably +5° C. from the phase transition temperature between the blue phase and the isotropic phase (a temperature at which the isotropic phase is exhibited), the response time can be made as short as 1 ms or less to realize high-speed response.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin which is cured with light having a wavelength with which the photopolymerization initiator to be used reacts may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used as appropriate. As the photopolymerization initiator, 2,2-dimethoxy-2-phenylacetophenone can be used.

As the sealant, it is preferable to use visible light curable, ultraviolet curable, or heat curable resin representatively. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included.

Figure 4B:
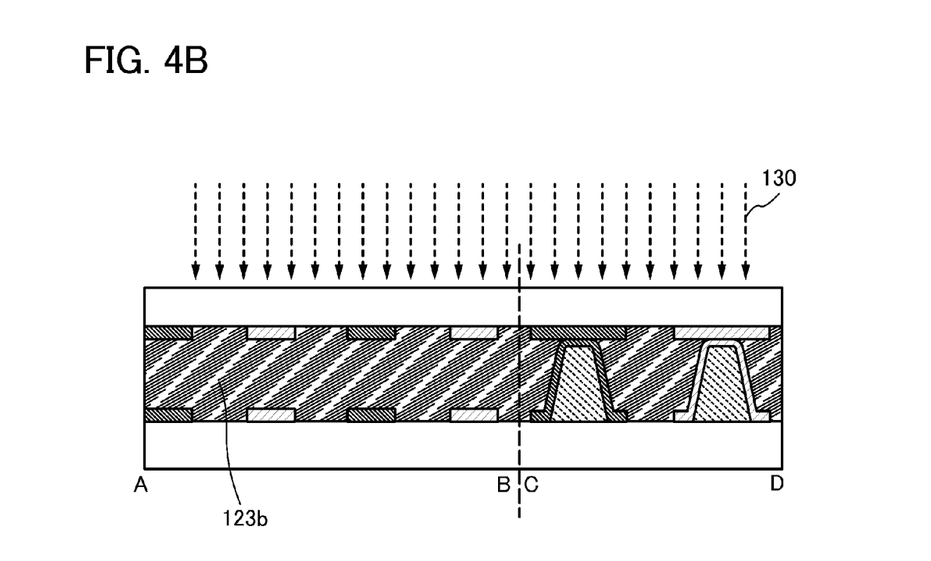

In this embodiment, the liquid crystal layer 123a is irradiated with light 130 to perform polymer stabilization treatment, so that the liquid crystal layer 123b is formed (see FIG. 4B). The light 130 is light having a wavelength with which the photocurable resin and the photopolymerization initiator contained in the liquid crystal layer 123a react. By this polymer stabilization treatment by light irradiation, the temperature range in which the liquid crystal layer 123b exhibits a blue phase can be widened.

In the case, for example, where a photocurable resin such as an ultraviolet curable resin is used as a sealant and a liquid crystal layer is formed by a dropping method, the sealant may be cured by the light irradiation step of the polymer stabilization treatment.

Next, a polarizing plate is provided outside the first substrate 121 (the opposite side to the liquid crystal layer 123b) and outside the second substrate 122 (the opposite side to the liquid crystal layer 123b). In addition to the polarizing plate, an optical film such as a retardation plate or an anti-reflection film may be provided. For example, circular polarization by the polarizing plate and the retardation plate may be used.

Through these steps, the liquid crystal shutter of this embodiment can be manufactured.

The liquid crystal shutter glasses in one embodiment of the present invention include a liquid crystal exhibiting a blue phase. A liquid crystal exhibiting a blue phase controls an electro-optic effect with the horizontal electric field and thus has a wide margin in the thickness direction of a cell gap. For example, a liquid crystal exhibiting a blue phase can be used in a general cell gap which is several µm. Alternatively, a liquid crystal exhibiting a blue phase can be used in a cell gap of 10 µm to 20 µm. In the present invention, the liquid crystal exhibiting a blue phase is used; thus, a cell gap is not required to be narrow. Therefore, decrease in manufacturing yield can be suppressed.

In a mode where a liquid crystal exhibiting a blue phase is used, a UV curing step is needed for stabilizing a blue phase; however, some of the steps generally required in a liquid crystal process (an alignment process such as a step of forming an alignment film by coating or rubbing treatment, and a cleaning process and a baking process performed before and after the alignment process) become unnecessary. Accordingly, the reduction of manufacturing steps and cost of the liquid crystal shutter glasses, high yield, and the like can be realized. Further, electrostatic discharge damage caused by the rubbing treatment can be prevented and defects and damage of the liquid crystal shutter glasses in the manufacturing process can be reduced.

With the above manufacturing method of the liquid crystal shutter described in this embodiment, liquid crystal shutter glasses in which light leakage at the time when the liquid crystal shutter is closed is suppressed can be provided. Accordingly, generation of crosstalk in the liquid crystal shutter glasses can be suppressed.

This embodiment can be combined with other embodiments.

Embodiment 3

In this embodiment, another structure of the liquid crystal shutter in one embodiment of the present invention will be described with reference to FIGS. 6A and 6B.

The structure of the liquid crystal shutter in this embodiment will be described.

Figure 6A:
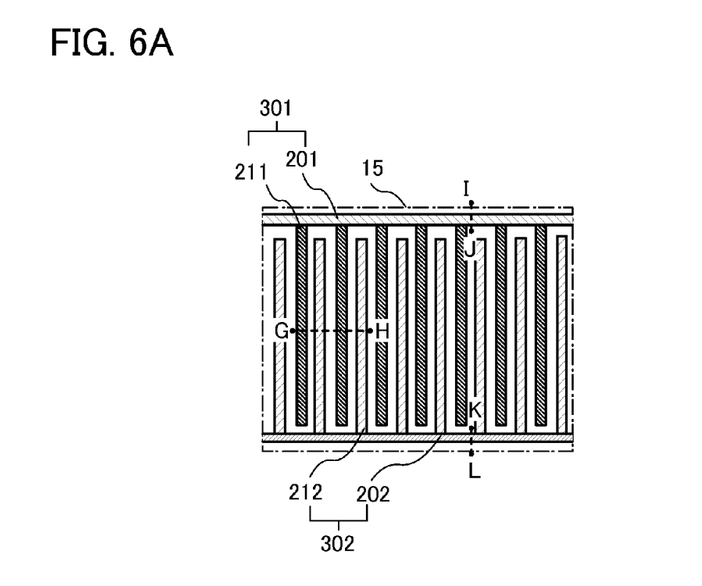
FIGS. 6A and 6B are diagrams showing a liquid crystal shutter of one embodiment of the present invention.

A liquid crystal shutter 15 shown in FIG. 6A includes an electrode 301 with a comb shape and a common electrode 302 with a comb shape. The electrode 301 and the common electrode 302 is each electrically connected to a driving unit (not shown).

In one embodiment of the present invention, the electrode 301 and the common electrode 302 are provided so as not to be in contact with each other.

The electrode 301 is formed using a metal film 201 and a conductive film 211 that transmits visible light. Similarly, the common electrode 302 is formed using a metal film 202 and a conductive film 212 that transmits visible light.

Figure 6B:
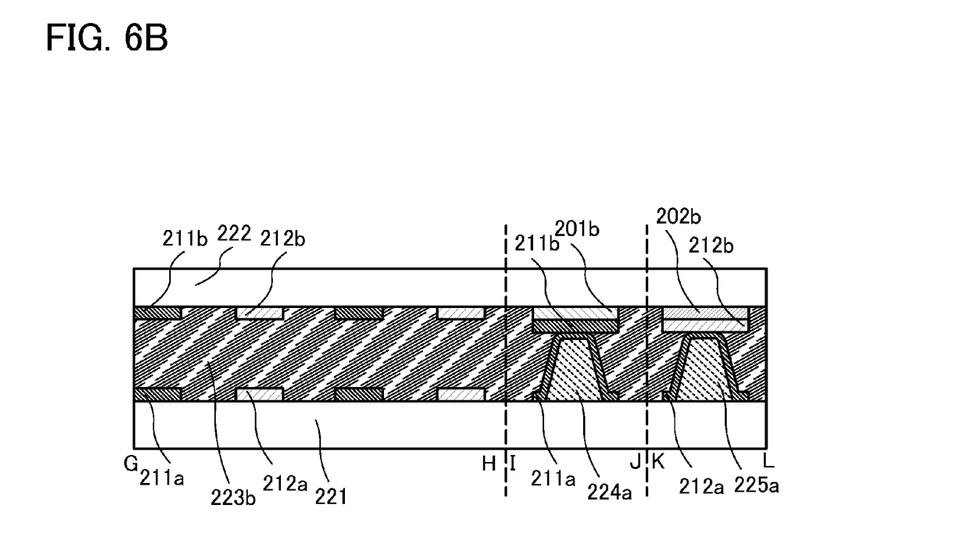

A cross-sectional view taken along the lines G-H, I-J, and K-L in FIG. 6A will be shown in FIG. 6B.

The liquid crystal shutter shown in FIG. 6B includes a first electrode 211a and a first common electrode 212a over a first substrate 221. The liquid crystal shutter further includes a second electrode 211b and a second common electrode 212b over a second substrate 222. In addition, a liquid crystal layer 223b exhibiting a blue phase is sandwiched between the first substrate 221 and the second substrate 222. Note that the liquid crystal shutter may have an insulating film between the first substrate 221 and the first electrode 211a and between the first substrate 221 and the first common electrode 212a.

As shown in FIG. 6B, the first electrode 211a overlaps with the second electrode 211b, and the first common electrode 212a overlaps with the second common electrode 212b.

In this embodiment, the first electrode 211a and the second electrode 211b have substantially the same shape and the first common electrode 212a and the second common electrode 212b have substantially the same shape from a plane view. The first electrode 211a and the second electrode 211b overlap each other with the liquid crystal layer 223b provided therebetween, and the first common electrode 212a and the second common electrode 212b overlap each other with the liquid crystal layer 223b provided therebetween. With this structure, a horizontal electric field can be generated widely in the liquid crystal layer.

A horizontal electric field is generated between the first electrode 211a and the first common electrode 212a in a portion take along line G-H in FIG. 6B. In addition, the horizontal electric field is also generated between the second electrode 211b and the second common electrode 212b.

The first electrode 211a and the second electrode 211b in FIG. 6B correspond to the conductive film 211 in FIG. 6A, and the first common electrode 212a and the second common electrode 212b correspond to the conductive film 212 in FIG. 6A. In other words, the first electrode 211a, the first common electrode 212a, the second electrode 211b, and the second common electrode 212b are formed using a conductive film that transmits visible light. With such a structure, the aperture ratio and transmittance of the liquid crystal shutter are not lowered, which is preferable.

In a portion take along line I-J, a first metal film 201b (corresponding to the metal film 201 in FIG. 6A) is formed over the second substrate 222 and the second electrode 211b is formed over the first metal film 201b. Similarly, in a portion take along line K-L, a second metal film 202b (corresponding to the metal film 202 in FIG. 6A) is formed over the second substrate 222 and the second common electrode 212b is formed over the second metal film 202b. The metal film is formed in a region serving as a non-opening portion of the liquid crystal shutter in the electrode and the common electrode of the liquid crystal shutter, whereby the resistance of the electrodes can be reduced, which is preferable. Note that the liquid crystal shutter may have an insulating film between the second substrate 222 and the first metal film 201b and between the second substrate 222 and the second metal film 202b.

The conductive films and the metal films that transmit visible light can be formed using the material described in Embodiment 2.

A projecting structure body 224a is provided over the first substrate 221 in a portion take along line I-J in FIG. 6B. A projecting structure body 225a is provided over the first substrate 221 in a portion take along line K-L in FIG. 6B. Note that the liquid crystal shutter may have an insulating film between the first substrate 221 and the structure bodies 224a and 225a.

The structure bodies in this embodiment may have a structure similar to that of the structure bodies in Embodiment 1.

The first electrode 211a covering the projecting structure body 224a is in contact with the second electrode 211b. The first common electrode 212a covering the projecting structure body 225a is in contact with the second common electrode 212b.

The first electrode 211a and the second electrode 211b are connected to each other, whereby the same potential can be applied to the first electrode and the second electrode using one voltage application unit.

Similarly, the first common electrode 212a and the second common electrode 212b are connected to each other, whereby the same potential can be applied to the first common electrode and the second common electrode using one voltage application unit.

Thus, the number of manufacturing steps and the manufacturing cost of the liquid crystal shutter glasses can be reduced.

A liquid crystal material exhibiting a blue phase is used for the liquid crystal layer 223b.

Note that the first substrate 221 and the second substrate 222 are each provided with an optical film such as a polarizing plate and an anti-reflective film (not shown) as appropriate.

As described above, a pair of electrodes is provided over each of the first substrate and the second substrate, so that the horizontal electric field can be generated uniformly and widely in the liquid crystal layer. The horizontal electric field is generated widely, whereby liquid crystals exhibiting a blue phase can be driven at low voltage.

In the electrode and the common electrode of the liquid crystal shutter in this embodiment, a conductive film that transmits visible light is used for the opening portion and a metal film is used for the non-opening portion. With such a structure, decrease in the aperture ratio and transmittance of the liquid crystal shutter can be suppressed. Further, the resistance of the electrode and the common electrode can be reduced.

Further, a pair of electrodes is provided on each of the first substrate and the second substrate, so that the horizontal electric field can be generated uniformly and widely in the liquid crystal layer even when each of the thicknesses of the electrodes is small. Thus, the influence of the electrode and the like on the polarization state of the transparent light can be suppressed. Accordingly, light leakage at the time when the liquid crystal shutter is closed can be suppressed. Consequently, generation of crosstalk in an image for the right eye and an image for the left eye at the time when the liquid crystal shutter glasses are used can be suppressed.

The first electrode and the second electrode are connected to each other in one embodiment of the present invention. In addition, the first common electrode and the second common electrode are connected to each other. Thus, the same potential can be applied to the first electrode and the second electrode and to the first common electrode and the second common electrode, using one voltage application unit. Thus, the number of manufacturing steps and the manufacturing cost of the liquid crystal shutter glasses can be reduced.

This embodiment can be freely combined with any of the other embodiments.

This application is based on Japanese Patent Application serial no. 2010-261810 filed with Japan Patent Office on Nov. 24, 2010, the entire contents of which are hereby incorporated by reference.

What is claimed is:

1. Liquid crystal shutter glasses comprising:
a first substrate and a second substrate with a liquid crystal layer therebetween;
a first electrode and a first common electrode between the first substrate and the liquid crystal layer;
a second electrode and a second common electrode between the second substrate and the liquid crystal layer;
a first insulating structure body with a projecting shape between a portion of the first electrode and the first substrate;
a second insulating structure body with a projecting shape between a portion of the first common electrode and the first substrate;
a third insulating structure body with a projecting shape between a portion of the second electrode and the second substrate; and
a fourth insulating structure body with a projecting shape between a portion of the second common electrode and the second substrate,
wherein the portion of the first electrode is in contact with the portion of the second electrode between the first insulating structure body and the third insulating structure body in the liquid crystal layer,
wherein the portion of the first common electrode is in contact with the portion of the second common electrode between the second insulating structure body and the fourth insulating structure body in the liquid crystal layer,
wherein the liquid crystal layer comprises a blue phase,
wherein each of the first electrode, the first common electrode, the second electrode, the second common electrode comprises a material having a transparent property,
wherein the first electrode comprises a first electrode portion not overlapping with the second electrode and a second electrode portion overlapping with the second electrode, and
wherein the first common electrode comprises a first common electrode portion not overlapping with the second common electrode and a second common electrode portion overlapping with the second common electrode.

2. The liquid crystal shutter glasses according to claim 1, wherein the first electrode, the second electrode, the first common electrode and the second common electrode each has a comb shape.

3. The liquid crystal shutter glasses according to claim 1, wherein the first electrode is overlapped with the second electrode, and
wherein the first common electrode is overlapped with the second common electrode.

4. A liquid crystal device comprising:
a first substrate and a second substrate with a liquid crystal layer therebetween;
a first electrode and a first common electrode between the first substrate and the liquid crystal layer;
a second electrode and a second common electrode between the second substrate and the liquid crystal layer;

a first insulating structure body with a projecting shape between a portion of the first electrode and the first substrate;
a second insulating structure body with a projecting shape between a portion of the first common electrode and the first substrate;
a third insulating structure body with a projecting shape between a portion of the second electrode and the second substrate; and
a fourth insulating structure body with a projecting shape between a portion of the second common electrode and the second substrate,
wherein the portion of the first electrode is in contact with the portion of the second electrode between the first insulating structure body and the third insulating structure body in the liquid crystal layer,
wherein the portion of the first common electrode is in contact with the portion of the second common electrode between the second insulating structure body and the fourth insulating structure body in the liquid crystal layer,
wherein the liquid crystal layer comprises a blue phase,
wherein each of the first electrode, the first common electrode, the second electrode, the second common electrode comprises a material having a transparent property,
wherein the first electrode comprises a first electrode portion not overlapping with the second electrode and a second electrode portion overlapping with the second electrode, and
wherein the first common electrode comprises a first common electrode portion not overlapping with the second common electrode and a second common electrode portion overlapping with the second common electrode.

5. The liquid crystal device according to claim 4,
wherein the first electrode, the second electrode, the first common electrode and the second common electrode each has a comb shape.

6. The liquid crystal device according to claim 4,
wherein the first electrode is overlapped with the second electrode, and
wherein the first common electrode is overlapped with the second common electrode.

* * * * *